United States Patent
Takahashi et al.

(10) Patent No.: US 6,315,692 B1
(45) Date of Patent: Nov. 13, 2001

(54) CONTROL APPARATUS FOR AUTOMATIC TRANSMISSION OF VEHICLE

(75) Inventors: Tooru Takahashi; Tadahiro Suzuki; Kimiaki Yamada, all of Tochigi-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/594,576

(22) Filed: Jun. 15, 2000

(30) Foreign Application Priority Data

Jul. 7, 1999 (JP) .................................................. 11-193016

(51) Int. Cl.$^7$ .................................................. F16H 45/02
(52) U.S. Cl. .............................................. 475/116; 74/335
(58) Field of Search ................................ 475/116; 74/335

(56) References Cited

U.S. PATENT DOCUMENTS 5,127,287 * 7/1992 Taniguchi et al. .................. 74/606 R
5,971,889 * 10/1999 Ohashi et al. ........................ 477/149

* cited by examiner

*Primary Examiner*—Dirk Wright
(74) *Attorney, Agent, or Firm*—Armstrong, Westerman, Hattori, McLeland & Naughton, LLP

(57) ABSTRACT

In a control apparatus for that automatic transmission of a vehicle which is provided with speed-change solenoid valves for regulating the hydraulic oil pressures in the hydraulic engaging elements through speed-change control valves corresponding to the hydraulic engaging elements, cleaning work to remove foreign matter in the solenoid valves is performed by varying the opening degree of the speed-change solenoid valves during running of the vehicle without affecting the hydraulic oil pressures in the hydraulic engaging elements. At the time of a line pressure control mode in which the line pressure is reduced below a maximum set pressure, the opening degree of the speed-change solenoid valve is varied within a range in which there is outputted a signal pressure higher than a minimum signal pressure required to fully open a speed-change control valve which corresponds to the hydraulic engaging element of the then-established speed transmission train.

2 Claims, 4 Drawing Sheets

|  | HYDRAULIC ENGAGING ELEMENT | | | | | SOLENOID VALVE | | | | |
|---|---|---|---|---|---|---|---|---|---|---|
|  | C1 | C2 | C3 | B1 | B2 | $7_1$ | $7_2$ | $7_3$ | $7_4$ | $7_5$ |
| FIRST SPEED | O | X | X | X | O | ON | ON | ON | OFF | ON |
| SECOND SPEED | O | X | X | O | X | ON | ON | ON | ON | OFF |
| THIRD SPEED | O | X | O | X | X | ON | ON | OFF | OFF | OFF |
| FOURTH SPEED | O | O | X | X | X | ON | OFF | ON | OFF | OFF |
| FIFTH SPEED | X | O | O | X | X | OFF | OFF | OFF | OFF | OFF |
| SIXTH SPEED | X | O | X | O | X | OFF | OFF | ON | ON | OFF |

CONTROL APPARATUS FOR AUTOMATIC TRANSMISSION OF VEHICLE

BACKGROUND OF THE INVENTION

1. Field of the Invention

The present invention relates to a control apparatus for an automatic transmission of a vehicle such as a motor vehicle in which the transmission has a plurality of hydraulic engaging elements for speed changing.

2. Description of Related Art

As this kind of control apparatus, there has conventionally been known a control apparatus which comprises a plurality of speed-change control valves corresponding to a plurality of hydraulic engaging elements and a plurality of speed-change solenoid valves corresponding to these speed-change control valves. The hydraulic oil pressure in each of the plurality of hydraulic engaging elements is adjusted depending on a signal pressure from a corresponding speed-change solenoid valve with a line pressure from a hydraulic oil pressure source serving as a base pressure. In this apparatus, the hydraulic oil pressure in each of the hydraulic engaging elements can be directly controlled by a controller which is made up of a vehicle-mounted computer through each of the speed-change solenoid valves. Therefore, the apparatus is advantageous in reducing the speed change shocks.

Further, there is also known an apparatus which is provided with a pressure regulating means for varying the line pressure, wherein the line pressure is decreased at the time of cruising of the vehicle so that the driving load of the hydraulic oil pressure source can be reduced, thereby improving the specific fuel consumption.

In the above-described apparatus in which the hydraulic oil pressures in the hydraulic engaging elements are controlled depending on the signal pressures from the speed-change solenoid valves, the deterioration in the controllability of the speed-change solenoid valves by the clogging or inclusion of foreign matter in the speed-change solenoid valves will be a big problem in commercializing the product.

Foreign matter which has clogged or has found its way into a speed-change solenoid valve can be removed by opening the solenoid valve. Thus, there is known an apparatus in which cleaning work is performed by intermittently opening the speed-change solenoid valve in a neutral range or in a parking range to thereby remove the foreign matter.

In the above-described conventional apparatuses, cleaning work is not performed while the vehicle is running in a running range. Therefore, there is a problem in improving the toughness against (or the ability to successfully cope with) the clogging or inclusion of foreign matter in the speed-change solenoid valve.

In view of the above-described points, the present invention has an object of providing a control apparatus for an automatic transmission of a vehicle in which the cleaning work to remove foreign matter can be performed during running of the vehicle without affecting the hydraulic oil pressure in the hydraulic engaging elements, whereby the toughness against the inclusion of foreign matter is improved.

SUMMARY OF THE INVENTION

In order to attain the above and other objects, the present invention is a control apparatus for an automatic transmission of a vehicle, the transmission having a plurality of hydraulic engaging elements for speed changing, the apparatus comprising: a plurality of speed-change control valves corresponding to the hydraulic engaging elements; a plurality of speed-change solenoid valves corresponding to the speed-change control valves, wherein a hydraulic oil pressure in each of the hydraulic engaging elements is regulated depending on a signal pressure from a corresponding speed-change solenoid valve with a line pressure from a hydraulic oil pressure source serving as a base pressure; and control means for varying, at a time of non-speed-changing, an opening degree of a speed-change solenoid valve corresponding to a predetermined speed-change control valve which corresponds to a hydraulic engaging element of a then-established speed transmission train, the opening degree being varied within a range in which there is outputted a signal pressure higher than a minimum signal pressure required to fully open the predetermined speed-change control valve.

By varying the opening degree of the speed-change solenoid valve within the above-described range, the foreign matter inside the speed-change solenoid valve can be removed without affecting the hydraulic oil pressure in the hydraulic engaging element. In addition, since the cleaning work can be performed during running of the vehicle by varying the opening degree of the speed-change solenoid valve, the cleaning work can be made at a higher frequency, with the result that the toughness against the clogging of foreign matter can be improved.

Preferably, the apparatus further comprises pressure regulating means for varying the line pressure depending on an operating condition of the vehicle. If the line pressure is thus decreased by the pressure regulating means below a maximum set pressure, the signal pressure required to make the hydraulic oil pressure in the hydraulic engaging element equal to the line pressure by fully opening the speed-change regulating valve is lowered, and the above-described range becomes wider. As a result, the amount of change in the opening degree of the speed change solenoid valve can be secured large, and the cleaning effect is improved. Therefore, in case the pressure regulating means to vary the line pressure depending on the running condition of the vehicle is provided, it is preferable to perform the varying of opening degree of the speed-change solenoid valve by the above-described control means at the time of non-speed-changing and at a time of line pressure control mode in which the line pressure is decreased by the pressure regulating means below a maximum set pressure.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 1:
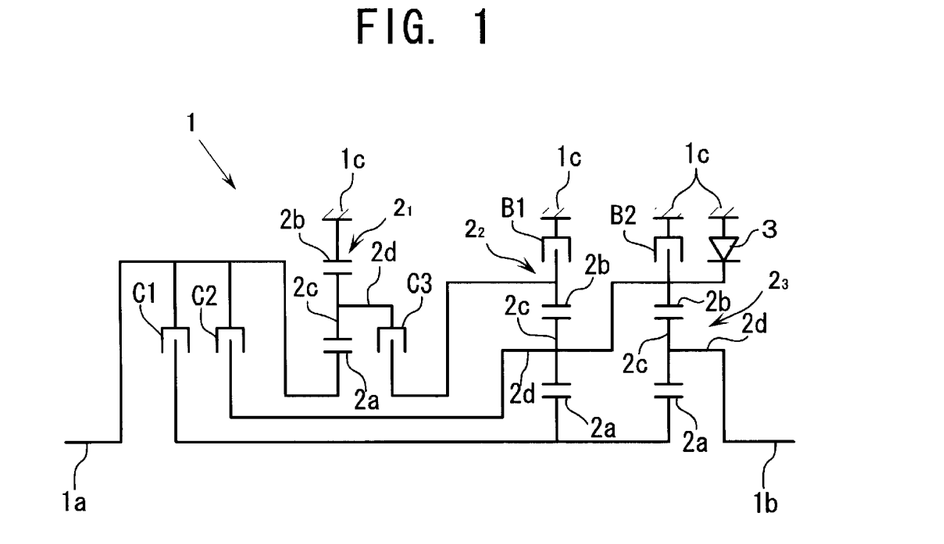
FIG. 1 is a skeleton diagram of an example of a transmission to which the apparatus of the present invention is applied.

With reference to FIG. 1, numeral 1 denotes an automatic transmission for a vehicle such as a motor vehicle. This transmission 1 is constituted by a planetary gear type of transmission which is provided with: an input shaft 1a which is connected to an engine through a fluid torque converter (both not illustrated); an output shaft 1b which is connected to driving wheels of the vehicle through a differential gear (not illustrated); and first through third, i.e., a total of three, planetary gears $2_1$, $2_2$ and $2_3$ which are disposed between the input shaft 1a and the output shaft 1b. The transmission 1 is thus arranged to provide speed changing of six forward transmission trains and one reverse transmission train.

Each of the planetary gears $2_1$, $2_2$ and $2_3$ comprises a sun gear 2a, a ring gear 2b, a pinion 2c which engages with both the sun gear 2a and the ring gear 2b, and a carrier 2d which rotatably supports the pinion 2c. The sun gear 2a of the first planetary gear $2_1$ is connected to the input shaft 1a, and the carrier 2d of the third planetary gear $2_3$ is connected to the output shaft 1b. The ring gear 2b of the first planetary gear $2_1$ is connected to a casing 1c of the transmission 1 to prevent the ring gear 2b from rotating. The sun gears 2a, 2a of the second and third planetary gears $2_2$, $2_3$ are connected to each other. Further, the carrier 2d of the second planetary gear $2_2$ and the ring gear 2b of the third planetary gear $2_3$ are connected to each other. The ring gear 2b of the third planetary gear $2_3$ is connected to the casing 1c through a one-way clutch 3 which serves as a reaction force receiving member.

The transmission 1 is provided with the following members as hydraulic engaging elements: i.e., a first clutch C1 for connecting the input shaft 1a to the sun gears 2a, 2a of the second and third planetary gears $2_2$, $2_3$; a second clutch C2 for connecting the input shaft 1a to the carrier 2d of the second planetary gear $2_2$; a third clutch C3 for connecting the carrier 2d of the first planetary gear $2_1$ to the ring gear 2b of the second planetary gear $2_2$; a first brake B1 for connecting the ring gear 2b of the second planetary gar $2_2$ to the casing 1c; and a second brake B2 for connecting the ring gear 2b of the third planetary gear $2_3$ to the casing 1c.

According to the above-described arrangement, when the first clutch C1 and the second brake B2 are engaged, a first-speed transmission train is established. When the first clutch C1 and the first brake B1 are engaged, a second-speed transmission train is established. When the first clutch C1 and the third clutch C3 are engaged, a third-speed transmission train is established. When the first clutch C1 and the second clutch C2 are engaged, a fourth-speed transmission train is established. When the second clutch C2 and the third clutch C3 are engaged, a fifth-speed transmission train is established. When the second clutch C2 and the first brake B1 are engaged, a sixth-speed transmission train is established. When the third clutch C3 and the second brake B2 are engaged, the reverse transmission train is established.

Figure 2:
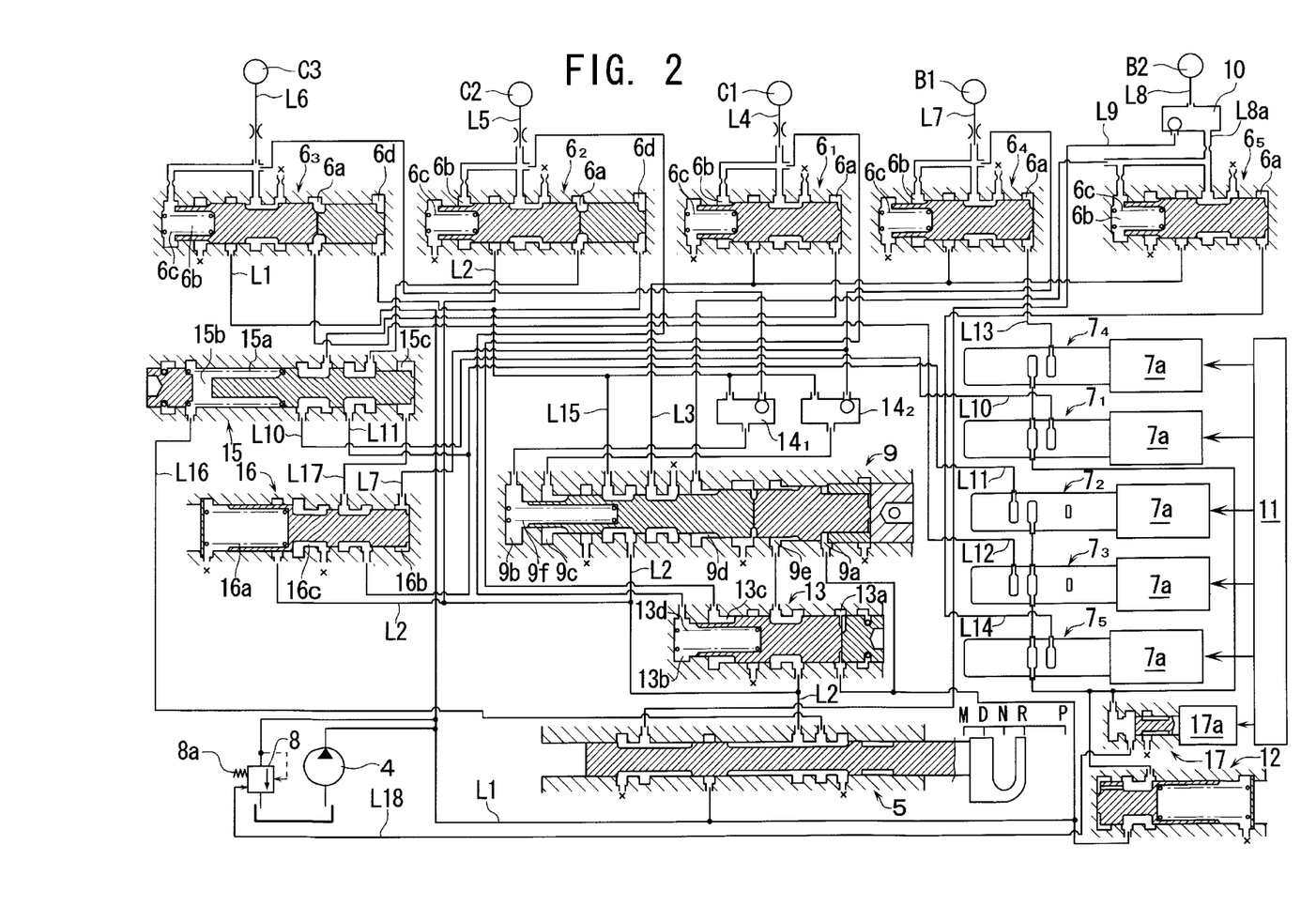
FIG. 2 is a hydraulic circuit diagram of one example of the apparatus of the present invention.

The operation of the clutches C1, C2 and C3 and the brakes B1 and B2 is controlled by a hydraulic circuit shown in FIG. 2. The hydraulic circuit is provided with: a hydraulic oil pressure source 4; a manual valve 5; first through fifth, i.e., a total of five, speed-change control valves $6_1$–$6_5$ which independently control the oil supply to, and discharge from, each of the clutches C1, C2 and C3 and each of the brakes B1 and B2; and first through fifth, i.e., a total of five, speed-change solenoid valves $7_1$–$7_5$ which independently control each of the speed-change control valves $6_1$–$6_5$.

The manual valve 5 can be changed over or switched among a total of five positions in an manner interlocked with the operation of a selector lever (not illustrated), i.e., P position for parking range, R position for reverse running range, N position for neutral range (illustrated position), D position for automatic transmission (or speed changing) range for forward running, and M position for manual transmission range for forward running. In the D and M positions, an oil passage L1 which is communicated with the hydraulic oil pressure source 4 to be driven by the engine is connected to an oil passage L2. Pressurized oil regulated by a regulator 8 to a predetermined line pressure is supplied to the oil passage L2. The hydraulic oil is thus constantly supplied through the oil passage L2 to the second speed-change control valve $6_2$ for the second clutch C2. The hydraulic oil is also supplied, through an oil passage L3 which is connected to the oil passage L2 through a fail-safe valve 9 which is described in more detail hereinafter: to the first speed-change control valve $6_1$, for the first clutch C1; to the fourth speed-change control valve $6_4$ for the first brake B1; and to the fifth speed-change control valve $6_5$ for the second brake B2. To the third speed-change control valve $6_3$ for the third clutch C3, the hydraulic oil is constantly supplied through the oil passage L1 irrespective of the manual valve 5.

Oil passages L4, L5, L6, L7 which are respectively communicated with the first through third clutches C1, C2, C3 and the first brake B1 are directly connected to each of the speed-change control valves $6_1$, $6_2$, $6_3$, $6_4$. An oil passage L8 which is communicated with the second brake B2, on the other hand, is arranged to be selectively connected, through a shuttle valve 10, to an oil passage L8a which is communicated with the fifth speed-change control valve $6_1$, and to an oil passage L9 which is communicated with the manual valve 5. The oil passage L9 is connected to the oil passage L1 in the R position of the manual valve 5. In this manner, in the R position, the second brake B2 is constantly engaged, so that the reverse transmission train is established as a result of the engagement of the third clutch C3 by the oil supply from the third speed-change control valve $6_3$.

Each of the speed-change control valves $6_1$–$6_5$ is provided with: an oil chamber 6a which forces each of the speed-change control valves $6_1$–$6_5$ toward the leftward oil supply position; an oil chamber 6b which forces each of the speed-change control valves $6_1$–$6_5$ toward the rightward oil discharge position (illustrated position); and a spring 6c which urges each of the speed-change control valves $6_1$–$6_5$ toward the oil discharge position. A signal pressure from each of the speed-change solenoid valves $7_1$–$7_5$ is inputted into the oil chamber 6a of each of the corresponding speed-change control valves $6_1$–$6_5$ through each of oil passages L10–L14 which are communicated with each of the speed-change solenoid valves $7_1$–$7_5$. Hydraulic oil pressure on the downstream side of each of the speed-change control valves $6_1$–$6_5$ is inputted into the oil chamber 6b of each of the speed-change control valves $6_1$–$6_5$. It is thus so arranged that the hydraulic oil pressure on the downstream side of each of the speed-change control valves $6_1$–$6_5$, i.e., the hydraulic oil pressure in each of the hydraulic engaging elements C1, C2, C3, B1, B2 can be regulated depending on the signal pressure from each of the speed-change solenoid valves $7_1$–$7_5$.

Each of the speed-change solenoid valves $7_1$–$7_5$ is constituted by a linear solenoid valve which outputs a signal pressure depending on the value of electric current charged to a solenoid 7a thereof. The electric charging to the solenoid 7a of each of the speed-change solenoid valves $7_1$–$7_5$ is controlled by a controller 11 which is made up of a vehicle-mounted computer. Modulator pressure (a certain pressure which is lower than the line pressure) from a modulator valve 12 which is connected to the oil passage L1 is inputted into each of the speed-change solenoid valves $7_1$–$7_5$. The signal pressure to be outputted at the fully opened condition of the modulator valve 12 becomes the modulator pressure.

In the D and M positions of the manual valve 5, it becomes possible to supply the hydraulic oil to all of the speed-change control valves $6_1$–$6_5$. When the signal pressures from the first and fifth speed-change solenoid valves $7_1$–$7_5$ are made high, the hydraulic oil is supplied to the first clutch C1 and the second brake B2 through the first and fifth speed-change control valves $6_1$, $6_5$, whereby the first-speed transmission train is established. When the signal pressures from the first and fourth speed-change change solenoid valves $7_1$–$7_4$ are made high, the hydraulic oil is supplied to the first clutch C1 and the first brake B1 through the first and fourth speed-change control valves $6_1$, $6_4$, whereby the second-speed transmission train is established. When the signal pressures from the first and third speed-change solenoid valves $7_1$–$7_3$ are made high, the hydraulic oil is supplied to the first clutch C1 and the third clutch C3 through the first and third speed-change control valves $6_1$, $6_3$, whereby the third-speed transmission train is established. When the signal pressures from the first and second speed-change solenoid valves $7_1$–$7_2$ are made high, the hydraulic oil is supplied to the first clutch C1 and the second clutch C2 through the first and second speed-change control valves $6_1$, $6_2$, whereby the fourth-speed transmission train is established. When the signal pressures from the second and third speed-change solenoid valves $7_2$, $7_3$ are made high, the hydraulic oil is supplied to the second clutch C2 and the third clutch C3 through the second and third speed-change control valves $6_2$, $6_3$, whereby the fifth-speed transmission train is established. When the signal pressures from the second and fourth speed-change solenoid valves $7_2$, $7_4$ are made high, the hydraulic oil is supplied to the second clutch C2 and the first brake B1 through the second and fourth speed-change control valves $6_2$, $6_4$, whereby the sixth-speed transmission train is established.

Further, in the D position, each of the speed-change solenoid valves $7_1$–$7_5$ is controlled by the controller 11 depending on the running conditions of the vehicle to thereby provide an automatic speed changing of first speed through the sixth speed. In the M position, each of the speed-change solenoid valves $7_1$–$7_5$ is controlled by the operation of an upshift switch and a downshift switch (both not illustrated) through the controller 11. Upshifting or downshifting is thus provided whenever the upshift switch or the downshift switch is switched on. In addition, at the time of speed changing, the pressure increase in a hydraulic engaging element to be engaged from now on (i.e., an on-coming hydraulic engaging element) and the pressure decrease in a hydraulic engaging element which has now been engaged but which is to be disengaged from now on (i.e., an off-going hydraulic engaging element) are appropriately controlled by the corresponding speed-change solenoid valves so that speed-change shocks do not occur.

Figure 3:
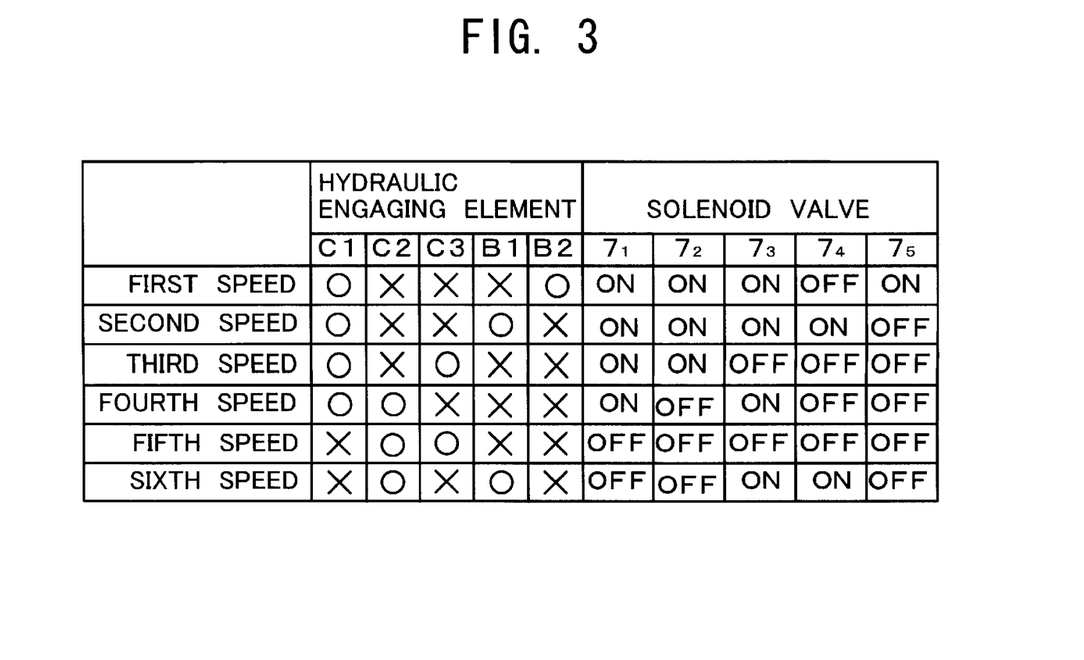
FIG. 3 is a table showing the state of engagement of hydraulic engaging elements and the state of electric charging of speed-change solenoid valves at the time of establishment of each speed transmission train.

Here, the first, fourth, and fifth speed-change solenoid valves $7_1$, $7_4$, $7_5$ are constituted into a normally-closed type, and the second and third speed-change solenoid valves $7_2$, $7_3$ are constituted into a normally-open type. The state of energizing or de-energizing of the solenoid $7a$ of each of the speed-change solenoid valves $7_1$–$7_5$ and the state of engagement or disengagement of the hydraulic engaging elements C1–C3, B1, B2 in the D position and M position are shown in the form of table in FIG. 3. In the table, a mark "O" denotes that the hydraulic engaging element is engaged and a mark "X" denotes that the hydraulic engaging element is released.

In case three or more hydraulic engaging elements are simultaneously engaged or in case the third clutch C3 and the first brake B1 are engaged even when two hydraulic engaging elements are simultaneously engaged, there occurs a so-called phenomenon of simultaneous engagement, whereby the transmission 1 becomes a locked state. Or else, in case the third clutch C3 and the second brake B2 are engaged while the vehicle is running forward, the reverse transmission train is established, whereby the transmission and the engine is subjected to an undue force or load.

Therefore, in this embodiment, the first through the fifth speed-change control valves $6_1$–$6_5$ are divided into the first group and the second group. The first group is made up, for example, of the second and third speed-change control valves $6_2$, $6_3$ which correspond to the second and third clutches C2, C3 for establishing, e.g., the fifth-speed transmission train. The second group is made up, for example, of the first, fourth, and fifth speed-change control valves $6_1$, $6_4$, $6_5$ which correspond to the remaining hydraulic engaging elements C1, B1, B2. The fail-safe valve 9 is interposed between the oil passage L3 which is communicated with the second group of speed-change control valves $6_1$, $6_4$, $6_5$ and the oil passage L2 which serves as an oil supply passage. At the time of failure in which a plurality of hydraulic engaging elements that should not be simultaneously engaged are supplied with the hydraulic oil, the hydraulic oil supply to the second group of speed-change control valves $6_1$, $6_4$, $6_5$ is stopped, to thereby prevent the above-described problem.

The fail-safe valve 9 can be switched between the leftward open position in which the oil passage L2 is connected to the oil passage L3 and the rightward closed position (illustrated position) in which this connection is shut off. To an oil chamber $9a$ on the right end of the fail-safe valve 9, the line pressure from the oil passage L1 is inputted, whereby the fail-safe valve 9 is forced toward the open position. In addition, the fail-safe valve 9 is provided with four oil chambers $9b$, $9c$, $9d$, $9e$ which force the fail-safe valve 9 toward the closed position. The hydraulic oil pressure from the third clutch C3 is inputted into the oil chamber $9b$ through the oil passage L6. The hydraulic oil pressure from the first brake B1 is inputted into the oil chamber $9c$ through the oil passage L7. The hydraulic oil pressure from the second brake B2 is inputted into the oil chamber $9d$ through the oil passage L8. The line pressure from the oil passage L2 is inputted into the oil chamber $9e$ through a composite signal valve 13 which is described in more detail hereinafter. In addition, the fail-safe valve 9 is further urged toward the closed position by a spring $9f$. When the hydraulic oil pressures to be inputted into any two of the oil chambers $9b$, $9c$, $9d$, $9e$ have exceeded a predetermined pressure, a combined force of the pushing force by these hydraulic oil pressures and the urging force by the spring $9f$ exceed a pushing force by the line pressure which is inputted into the oil chamber $9a$. As a result, the fail-safe valve 9 can be switched to the closed position. The composite signal valve 13 can be switched between the rightward open position (illustrated position) in which the oil passage L2 is connected to the oil chamber $9e$, and the leftward closed position in which this connection is shut off. The line pressure from the oil passage L1 is inputted into a right end oil chamber $13a$ of the composite signal valve 13 to thereby force this valve 13 toward the closed position. In addition, the composite signal valve 13 is provided with two oil chambers $13b$, $13c$ which force this valve 13 toward the open position. The hydraulic oil pressure of the second clutch C2 is inputted into the oil chamber 13b through the oil passage L5, and the hydraulic oil pressure of the first clutch C1 is inputted into the oil chamber 13c through the oil passage L4, respectively. Further, the composite signal valve 13 is urged toward the open position by the spring 13d. In this manner, when a state has been attained in which both the first and second clutches C1, C2 are engaged (i.e., a state of fourth-speed transmission train), the combined force of pushing by the hydraulic oil pressures to be inputted into the oil chambers 13b, 13c and of urging by the spring 13d exceeds the pushing force by the line pressure to be inputted into the oil chamber 13a, whereby the composite signal valve 13 is switched to the open position.

In this manner, when both the first and second clutches C1, C2 are engaged, the line pressure is inputted into the oil chamber 9e of the fail-safe valve 9. In this state, if the hydraulic oil is supplied to any one of the hydraulic engaging elements C3, B1, B2, the fail-safe valve 9 is switched to the closed position. Further, even in a state in which only one of the first and second clutches C1, C2 is engaged or in which both the clutches C1, C2 are disengaged and the line pressure is thus not inputted into the oil chamber 9e, if the hydraulic oil is supplied to two or more of the other hydraulic engaging elements C3, B1, B2, the fail-safe valve 9 is switched to the closed position. Then, as a result of the switching of the fail-safe valve 9 to the closed position, the connection between the oil passage L2 and the oil passage L3 is shut off. In the end, at the time of failure, the oil supply to the second group of speed-change control valves $6_1$, $6_4$, $6_5$ is stopped and, consequently, the corresponding hydraulic engaging elements C1, B1, B2 are disengaged.

Further, there is provided an oil passage L15 which is connected to the oil passage L2 through the fail-safe valve 9 at the closed position of the fail-safe valve 9. The oil passage L6 which is communicated with the third clutch C3, and the oil passage L15 are connected to the oil chamber 9b of the fail-safe valve 9 through a shuttle valve $14_1$. Still furthermore, the oil passage L7 which is communicated with the first brake B1, and the oil passage L15 are connected to the oil chamber 9c of the fail-safe valve 9 through a shuttle valve 142. In this arrangement, once the fail-safe valve 9 has been switched to the closed position, the line pressure from the oil passage L2 is inputted into the oil chambers 9b, 9c through the oil passage L15. Even if the hydraulic oil pressure in the corresponding hydraulic engaging elements C1, B1, B2 is lowered as a result of stopping of the hydraulic oil supply to the second group of speed-change control valves $6_1$, $6_4$, $6_5$, the fail-safe valve 9 is held or retained at the closed position, whereby the chattering of the fail-safe valve 9 can be prevented.

Even if the fail-safe valve 9 is switched to the closed position at the time of failure, the oil passage L2 and the oil passage L1, which serve as oil supply passages, remain connected respectively to the second speed-change control valve $6_2$ and the third speed-change control valve $6_3$ of the first group. Therefore, the fifth-speed transmission train can be established by engaging the second clutch C2 and the third clutch C3. However, if the second speed-change control valve $6_2$ or the third speed-change control valve $6_3$ can no longer be switched toward the oil supply position due to poor control of the second speed-change solenoid valve $7_2$ or the third speed-change solenoid valve $7_3$, i.e., if the high signal pressure can no longer be outputted from these solenoid valves $7_2$, $7_3$ due to ON-failure (i.e., failure in which the solenoids are kept energized) of the normally-open type of second and third speed-change solenoid valves $7_2$, $7_3$, the hydraulic oil can no longer be supplied to the second and third clutches C2, C3, with the result that the fifth-speed transmission train cannot be established.

To cope with this kind of problem, in this embodiment, a second oil chamber 6d which forces the second and third speed-change control valves $6_2$, $6_3$ toward the oil supply position is provided in each of these valves $6_2$, $6_3$. The oil passage L15 is connected to these oil chambers 6d, 6d. At the closed position of the fail-safe valve 9, the line pressure from the oil passage L2 which serves as an oil supply passage is inputted into the oil chambers 6d, 6d through the oil passage L15. Each of the speed-change control valves $6_2$ $6_3$ is thus forcibly switched to, and held at, the oil supply position. In this manner, when the fail-safe valve 9 is switched to the closed position at the time of failure, the hydraulic oil is forcibly supplied to both the second and third clutches C2, C3, whereby the fifth-speed transmission train is surely established.

In case the electric power supply to all of the speed-change solenoid valves $7_1$–$7_5$ is stopped as a result of system failure due, for example, to the breaking of electric wires or the like, only the signal pressures of both the normally-open type of second and third speed-change solenoid valves $7_2$, $7_3$ become high. The hydraulic oil is thus supplied to the second and third clutches C2, C3 through the second and third speed-change control valves $6_2$, $6_3$, whereby the fifth-speed transmission train is established. However, with the fifth-speed transmission train alone, it becomes difficult to start the vehicle to run or to drive the vehicle at a low speed. Therefore, at the time of system failure, it is desired to make it possible to establish, in the D position, the fifth-speed transmission train and to establish, in the M position, a lower-speed transmission train which is lower than the fifth-speed transmission train, e.g., the third-speed transmission train so that, by the range switchover operation between the D position and M position, the speed changing to the fifth speed and to the third speed can be made. To enable the above operation, it becomes necessary to engage the first clutch C1, in place of the second clutch C2, in the M position.

Therefore, in this embodiment, there is provided a changeover valve 15 which selectively connects an oil passage L11 communicated with the second speed-change solenoid valve $7_2$ to the oil chamber 6a of the second speed-change control valve $6_2$ and to the oil chamber 6a of the first speed-change control valve $6_1$. In this manner, it is so arranged that the following connections can be made at the time of system failure. Namely, in the D position, the oil passage L11 is connected to the oil chamber 6a of the second speed-change control valve $6_2$ to switch the second speed-change control valve $6_2$ to the oil supply position by the high signal pressure from the second speed-change solenoid valve $7_2$, whereby the second clutch C2 is engaged. In the M position, the oil passage L11 is connected to the oil chamber 6a of the first speed-change control valve $6_1$ to switch the first speed-change control valve $6_1$ to the oil supply position, whereby the first clutch C1 is engaged.

The changeover valve 15 can be switched between the following two positions, i.e.: a rightward first changeover position (illustrated position) in which the oil passage L10 communicated with the first speed-change solenoid valve $7_1$ and the oil passage L11 communicated with the second speed-change solenoid valve $7_2$ are respectively connected to the oil chamber 6a of the first speed-change control valve $6_1$ and the oil chamber 6a of the second speed-change control valve $6_2$; and a leftward second changeover position in which these connections are shut off to thereby connect the oil passage L11 to the oil chamber 6a of the first speed-change control valve $6_1$. The changeover valve 15 is urged toward the first changeover position by a spring 15a. In addition, the changeover valve 15 is provided with a left end oil chamber 15b which forces the changeover valve 15 toward the first changeover position, and a right end oil chamber 15c which forces the changeover valve 15 toward the second changeover position. To the oil chamber 15b, there is connected an oil passage L16 which is connected to the oil passage L1 in the D position of the manual valve 5 and which is opened to the atmosphere in the M position thereof. To the oil chamber 15c, there is inputted the signal pressure from the second speed-change solenoid valve $7_2$ through an oil passage L17 which is branched from the oil passage L11. In this arrangement, in the D position, the line pressure from the oil passage L1 is inputted into the oil chamber 15b. As a result, even if the signal pressure from the second speed-change solenoid valve $7_2$ becomes a maximum pressure (modulator pressure) due to the system failure, the changeover valve 15 is held at the first changeover position. In the M position, on the other hand, the oil chamber 15b is opened to the atmosphere through the oil passage L16. Therefore, when the signal pressure from the second speed-change solenoid valve $7_2$ becomes maximum due to the system failure, the changeover valve 15 is switched to the second changeover position. As a result, the first speed-change control valve $6_1$ is switched to the oil supply position as explained hereinabove, and the first clutch C1 is engaged, whereby the third-speed transmission train is established.

When the system failure occurs while the vehicle is running at a high speed in a high-speed transmission train of the fourth-speed transmission train or above in the M position to thereby down-shift to the third-speed transmission train, there is a possibility that the engine gives rise to an excessive rotation. As a solution, in this embodiment, there is interposed in the oil passage L17 a gate valve (open-close valve) 16 which can be switched between a rightward open position (illustrated position) in which the oil passage L17 is open to fluid flow and a leftward closed position in which the fluid flow in the oil passage L17 is shut off. The gate valve 16 is forced by a spring 16a toward the open position. In addition, to a right end oil chamber 16b of the gate valve 16, there is connected the oil passage L7 which is communicated with the first brake B1 to be engaged at the time of establishment of a low-speed transmission train, e.g., the second-speed transmission train, which is lower than the third-speed transmission train. When the second-speed transmission train is established, the gate valve 16 can thus be switched to the closed position against the spring 16a by the hydraulic oil pressure of the first brake B1. Further, the gate valve 16 has formed therein an annular groove 16c which is communicated with the oil passage L2 in the closed position. The diameter of a left land in the annular groove 16c is made larger than that of a right land. Once the gate valve 16 has been switched to the closed position, an urging force toward the left, which is due to the difference in the diameter between the right and left lands, is operated by the line pressure which is inputted from the oil passage L2 into the annular groove 16c. As a result of this urging force, the gate valve 16 is held at the closed position irrespective of the hydraulic oil pressure of the first brake B1.

According to the above-described arrangement, when the second-speed transmission train has been established after starting in the D position or in the M position, the gate valve 16 is switched to the closed position. Thereafter, as long as the manual valve 5 is in the D position or in the M position, the gate valve 16 is held at the closed position, and the signal pressure from the second speed-change solenoid valve $7_2$ will no longer be inputted into the oil chamber 15c of the changeover valve 15. Therefore, even if the system fails in the M position, the changeover valve 15 will not be switched to the second changeover position. At the time of system failure, the fifth-speed transmission train is established and, therefore, downshifting to the third-speed transmission train due to the system failure will not occur while running at a high speed. In addition, even if the gate valve 16 is switched and held at the closed position, the oil passage L2 is opened to the atmosphere by switching to the N position. Therefore, the gate valve 16 is returned to the open position by the urging force of the spring 16a. In this manner, at the time of a system failure, if the manual valve 5 is switched once to the N position and then to the M position, the changeover valve 15 is switched to the second changeover position, whereby the third-speed transmission train is established as explained hereinabove. The speed can thus be changed between the fifth speed and the third speed by switching the range between the D position and the M position.

In the R position, the second brake B2 is constantly engaged as explained hereinabove. By the engagement of the third clutch C3 as a result of the hydraulic oil supply from the third speed-change control valve $6_3$, the reverse transmission train is established.

In this embodiment, aside from the speed-change solenoid valves $7_1$–$7_5$, there is further provided a solenoid valve 17 for the regulator 8. By the hydraulic oil pressure in an oil passage L18 on the output side of the solenoid valve 17, the regulator 8 is forced toward a non-leaking side. This regulator 8 and the solenoid valve 17 constitute a pressure regulating means which varies the line pressure. The solenoid valve 17 is constituted into an ON-OFF type of normally-open solenoid valve into which the modulator pressure is inputted. The duty of the electric charging to a solenoid 17a of the solenoid valve 17 is controlled by the controller 11. If the duty ratio of electric charging to the solenoid 17a is made to 0%, i.e., if the electric charging to the solenoid 17a is stopped, the regulator 8 is pushed to the non-leaking side by the spring 8a and by the modulator pressure from the oil passage L18. The line pressure thus becomes the maximum set pressure Pmax that is defined by total urging forces of the spring 8a and the modulator pressure. If the duty ratio of electric charging to the solenoid is increased, the hydraulic oil pressure in the oil passage L18 decreases and the line pressure is thus decreased.

Figure 4:
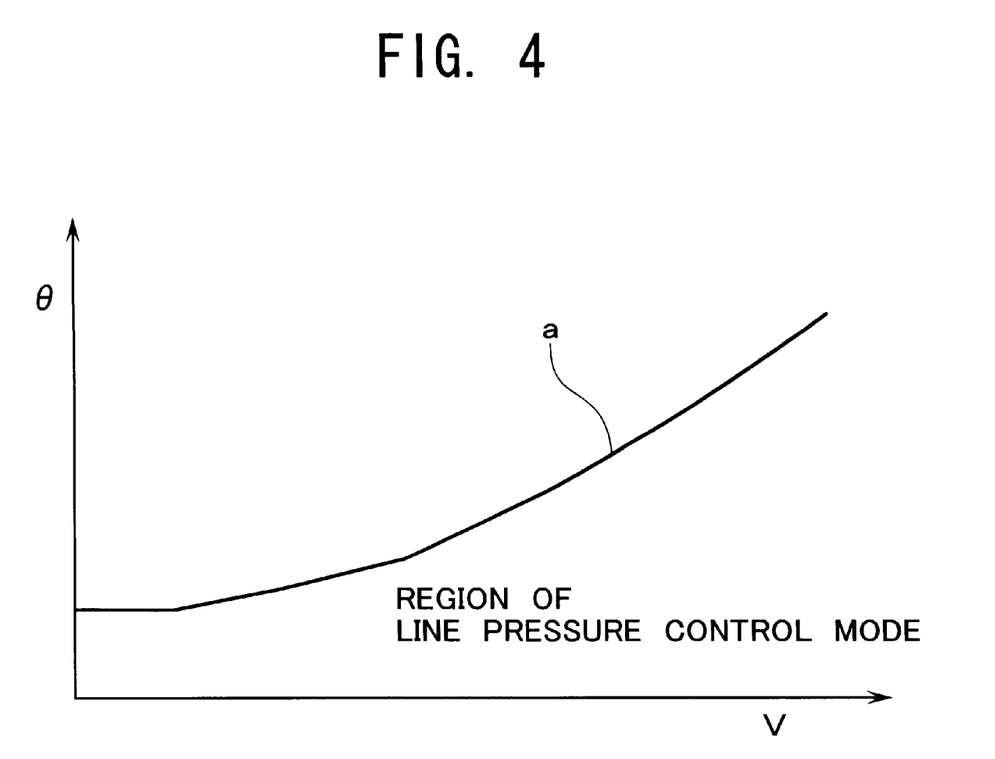
FIG. 4 is a graph showing the region of performing a line pressure control mode.

A line pressure control mode in which the line pressure is made lower than the maximum set pressure Pmax is performed in all regions in the P and N positions. This mode is also performed in the D and M positions at the time of non-speed changing in a predetermined driving region which lies on the side of a smaller throttle opening degree of a mode switching characteristic curve "a" in FIG. 4 which is determined with the vehicle speed V and the actual throttle opening degree θ of the engine as parameters. This characteristic curve "a" is set for each of the speed transmission trains. In the line pressure control mode in the D and M positions, a torque to be shared by the hydraulic engaging element (hereinafter also called "the shared torque") for a speed transmission train which is established at that particular time (hereinafter called "the then-established speed transmission train") is calculated based on the input torque of the transmission. Then, that hydraulic oil pressure in each of the hydraulic engaging elements which is required to transmit this shared torque is obtained. Let the maximum hydraulic oil pressure among the hydraulic oil pressures required for the respective hydraulic engaging elements be defined as a target pressure. The duty of the solenoid valve 17 is controlled so that the line pressure becomes this target pressure. By thus performing the line pressure control mode, the driving load on the hydraulic oil pressure source 4 at the time of cruising of the vehicle can be reduced, with the result that the specific fuel consumption can be improved.

At the time of non-speed-changing, the speed-change control valve corresponding to the hydraulic engaging element of the then-established speed transmission train is fully opened to thereby maintain the hydraulic oil pressure in the hydraulic engaging element to the line pressure. When the line pressure is decreased, however, the force to urge the speed-change control valve toward the closed side decreases. Therefore, even if that signal pressure from the speed-change solenoid valve which is inputted into the speed-change control valve is relatively low, the speed-change control valve becomes a fully-opened state.

Therefore, in this embodiment, at the time of line pressure control mode in the D and M positions, the opening degree of the speed-change solenoid valve is varied in the manner as described hereinbelow. Namely, within a range in which there is outputted a signal pressure higher than the minimum signal pressure that is required to fully open the speed-change control valve which corresponds to the hydraulic engaging element for the then-established speed transmission train, the opening degree of the speed-change solenoid valve corresponding to this speed-change control valve (i.e., the first and fifth speed-change solenoid valves $7_1$, $7_5$ at the time of first speed; the first and fourth speed-change solenoid valves $7_1$, $7_4$ at the time of second speed; the first and third speed-change solenoid valves $7_1$, $7_3$ at the time of third speed; the first and second speed-change solenoid valves $7_1$, $7_2$ at the time of fourth speed; the second and third speed-change solenoid valves $7_2$, $7_3$ at the time of fifth speed; and the second and fourth speed-change solenoid valves $7_2$, $7_4$ at the time of sixth speed) is varied. The cleaning work to remove foreign matter inside the speed-change solenoid valves $7_1$–$7_5$ is thereby performed.

Figure 5A:
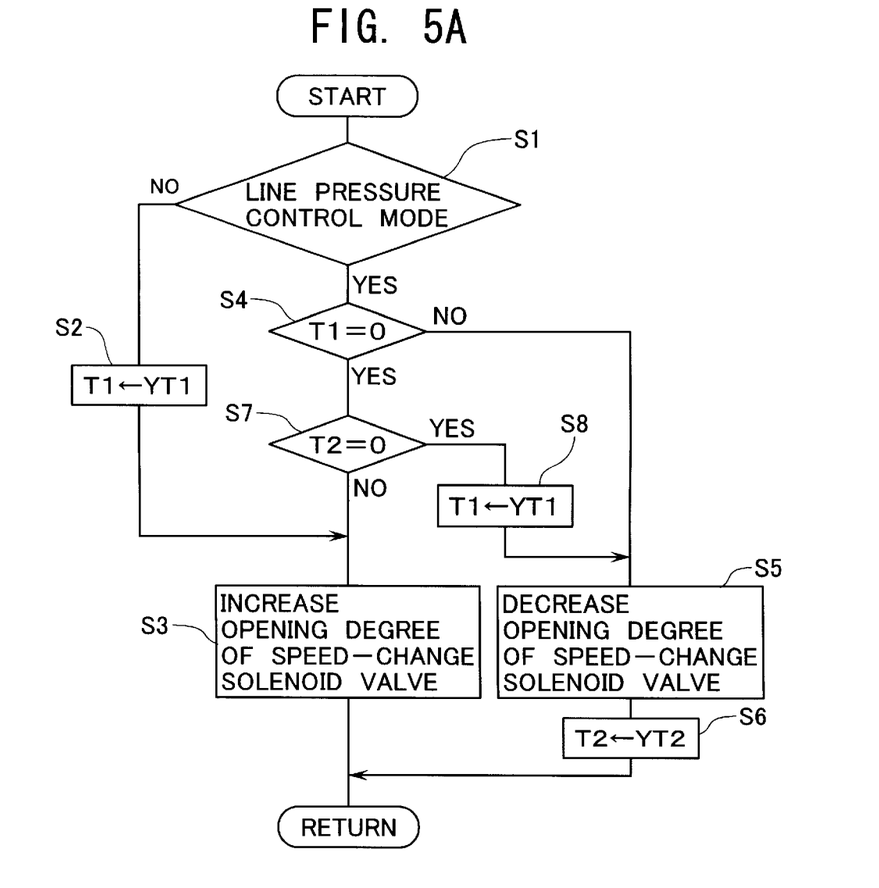
FIG. 5A is a flow chart showing the program for cleaning work and FIG. 5B is a time chart showing the changes in the line pressure and in the opening degree of the speed-change solenoid valve.

This cleaning work is performed by the controller 11 which serves as a control means according to the program shown in FIG. 5A. In more detail, first, at step S1, a discrimination is made as to whether the mode is in the line pressure control mode or not. If the mode is not in the line pressure control mode, the program proceeds to step S2, where the remaining time T1 in a subtraction type of first timer is set to a predetermined set time YT1.

The program then proceeds to step S3, where the opening degree of a speed-change solenoid valve to control a predetermined speed-change control valve which corresponds to the hydraulic engaging element of the then-established speed transmission train is increased up to the full open degree.

At the time of line pressure control mode, the program proceeds to step S4, where a discrimination is made as to whether the remaining time T1 in the first timer has become zero or not. If T1≠0, the program proceeds to step S5, where the opening degree of the speed-change solenoid valve is decreased to a minimum required opening degree that is required to output the minimum signal pressure required to fully open the above-described speed-change control valve. Then, at step S6, the remaining time in a subtraction type of second timer is set to a predetermined set time YT2.

When T1=0, the program proceeds to step S7, where a discrimination is made as to whether the remaining time T2 in the second timer has become zero or not. If T2≠0, the program proceeds to step S3, where the opening degree of the above-described speed-change solenoid valve is increased. When T2=0, T1 is set to YT1 at step S8 and thereafter the program proceeds to step S5 and the following steps to decrease the opening degree of the above-described speed-change solenoid valve.

Figure 5B:
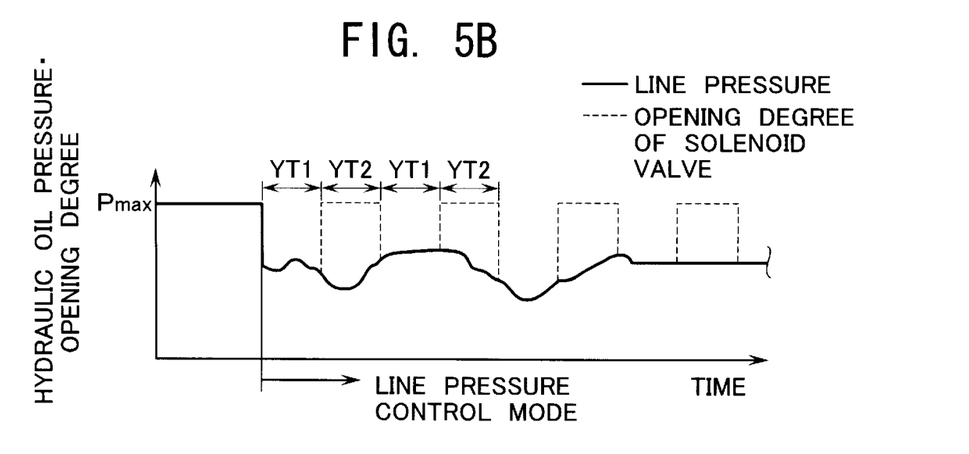

In this manner, at the time of the line pressure control mode, as shown in FIG. 5B, the opening degree of the above-described speed-change solenoid valve repeatedly changes by a decrease for the duration of time of YT1 and by an increase for the duration of time of YT2. In this embodiment, the opening degree of the speed-change solenoid valve is increased at step S3 to the opening degree of full opening and then at step S5 decreases to the minimum required opening degree. It is also possible to make the following arrangement. Namely, a threshold value is set on an upper end and on a lower end, respectively, between the fully-opened opening degree and the minimum required opening degree. The opening degree of the speed-change solenoid valve is increased at step S3 to the upper-end threshold value and is decreased at step S5 to the lower-end threshold value.

In the P and N positions, since the supply of the line pressure to all of the speed-change control valves $6_1$–$6_5$ is stopped, each of the hydraulic engaging elements remains disengaged even if each of the speed-change control valves $6_1$–$6_5$ becomes fully opened. Then, in the P and N positions, cleaning work can be performed on all of the speed-change solenoid valves $7_1$–$7_5$ by changing the opening degree between the opening degree of full opening and the opening degree of full closing.

As can be seen from the above-described explanations, according to the present invention, the cleaning work can be performed during the running of the vehicle without affecting the hydraulic oil pressure in the hydraulic engaging elements. The cleaning work can therefore be made more frequently and, as a consequence, the toughness against the clogging of foreign matter can be improved.

It is readily apparent that the above-described hydraulic control apparatus for a hydraulically controlled vehicular transmission meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A control apparatus for an automatic transmission of a vehicle, said transmission having a plurality of hydraulic engaging elements for speed changing, said apparatus comprising:

a plurality of speed-change control valves corresponding to said hydraulic engaging elements;

a plurality of speed-change solenoid valves corresponding to said speed-change control valves, wherein a hydraulic oil pressure in each of said hydraulic engaging elements is adjusted depending on a signal pressure from a corresponding speed-change solenoid valve with a line pressure from a hydraulic oil pressure source serving as a base pressure; and control means for varying, at a time of non-speed-changing, an opening degree of a speed-change solenoid valve corresponding to a predetermined speed-change control valve which corresponds to a hydraulic engaging element of a then-established speed transmission train, said opening degree being varied within a range in which there is outputted a signal pressure higher than a minimum signal pressure required to fully open said predetermined speed-change control valve.

2. A control apparatus according to claim 1, further comprising pressure regulating means for varying the line pressure depending on an operating condition of the vehicle, wherein varying of the opening degree of said speed-change solenoid valve by said control means is performed at the time of non-speed-changing and at a time of a line pressure control mode in which the line pressure is decreased by said pressure regulating means below a maximum set pressure.

* * * * *